United States Patent Office 3,156,551
Patented Nov. 10, 1964

3,156,551
HERBICIDAL COMPOSITION OF REDUCED TENDENCY TO CORRODE IRON AND ZINC
Robert Coles Brian, Bracknell, England, assignor to Imperial Chemical Industries Limited, London, England, a corporation of Great Britain
No Drawing. Filed May 29, 1961, Ser. No. 113,076
Claims priority, application Great Britain June 9, 1960
21 Claims. (Cl. 71—2.4)

This invention relates to herbicidal compositions containing a herbicidal dipyridylium quaternary salt and a corrosion inhibitor.

The use as herbicides of a variety of dipyridylium quaternary salts is disclosed in our United Kingdom specification Nos. 785,732, 813,531, 813,532, 815,348 and 12,870/58; and these salts have been found to be very effective herbicides when used in the form of aqueous solutions. However, it has been found that in some instances where the aqueous solutions are stored in vessels or used in spray equipment made of zinc or galvanised iron corrosion of the latter occurs, which makes continual use of such vessels or equipment for the aqueous compositions unsuitable.

We have now found that the corrosive action upon zinc and galvanised iron can be lessened very considerably by using in conjunction with the diquaternary salt a corrosion inhibitor containing a water-soluble molybdate and a phosphate which when dissolved in water gives rise to $H_2PO_4^-$ ions.

Accordingly, the present invention consists in a herbicidal composition comprising a herbicidal dipyridylium quaternary salt, an effective proportion of a phosphate which when dissolved in water gives rise to $H_2PO_4^-$ ions, and an effective proportion of a water-soluble molybdate.

The phosphate used in the composition of this invention can be a dihydrogen orthophosphate, for example potassium, sodium, calcium or ammonium dihydrogen orthophosphate. However, where it is both possible and desirable to obtain the composition in stable form at a pH of about 3–7, a monohydrogen orthophosphate can sometimes be used, for instance di-potassium or di-sodium monohydrogen orthophosphate. Where a monohydrogen orthophosphate is used, it can in suitable conditions be used in admixture with a dihydrogen orthophosphate; for example there can be used a mixture containing potassium dihydrogen and di-potassium hydrogen orthophosphates.

The phosphate (or mixture of phosphates) can be used in an amount from 1% to 20%, or even more, of the weight of the quaternary salt used, but especially from 5–15% by weight. The preferred proportions of phosphate to quaternary salt appear to vary according to the cation of the phosphate; for example it has been found that where calcium phosphate is used the amount required with a given amount of quaternary salt is less than where sodium or potassium phosphate is used. It appears that the amount of phosphate required varies in a direct ratio with its solubility in water.

In general the molybdate is preferably used in an amount of about one tenth of that of the phosphate used. However, larger amounts of molybdate can be used if desired, especially where the phosphate is sodium phosphate. Very satisfactory results have been obtained using sodium molybdate in an amount of from 0.1 to 2% and especially from 0.2 to 1% by weight of the quaternary salt.

The dipyridylium quaternary salt used in the composition of the invention can be a 1,1'-ethylene-2,2'-dipyridylium salt, for example those disclosed in specifications Nos. 785,732 and 12,870/58; a 4,4'-dipyridylium salt, for example those disclosed in specifications Nos. 813,531 and 813,532; or one of the pyridylium isoquinolinium quaternary salts disclosed in specification No. 815,348, which can be regarded as dipyridylium salts in which one of the pyridine rings carries a fused benzene ring. The dipyridylium quaternary salt can optionally be either unsubstituted or contain one or more substituent groups, for example alkyl groups having from 1 to 4 carbon atoms, for instance methyl or ethyl radicals. Examples of substituted dipyridylium salts are those disclosed in specification No. 12,870/58.

Examples of suitable dipyridylium quaternary salts are 1,1'-ethylene-2,2'-dipyridylium dibromide and the corresponding dichloride, 1,1'-dimethyl-4,4'-dipyridylium di-(methylsulphate) and the corresponding dichloride and 1,1' di-β-hydroxyethyl-4,4'-dipyridylium dichloride.

The compositions of the invention can be solid compositions suitable for subsequent solution in water, or they can be liquid compositions, for example aqueous solutions. These liquid compositions can be either concentrated compositions suitable for subsequent dilution with water or more dilute compositions suitable for use without dilution as herbicide sprays. The invention accordingly also consists in a liquid herbicidal composition comprising a solution or dispersion in water of a herbicidal dipyridylium salt, the water containing effective proportions of molybdate ions and $H_2PO_4^-$ ions.

The invention is illustrated by the following examples.

EXAMPLES 1–11

These examples illustrate the protection provided by mixtures of various proportions of sodium molybdate and sodium dihydrogen phosphate ($NaH_2PO_4$) for galvanised iron in contact with a 1% aqueous solution of 1,1'-ethylene 2,2'-dipyridylium dibromide monohydrate which is referred to below by its common name "diquat dibromide monohydrate."

Two 1% aqueous solutions of diquat dibromide monohydrate were prepared, each of 100 cc. volume. In the first of these solutions was dissolved the sodium dihydrogen phosphate and the sodium molybdate. The second solution was used as a control and contained neither phosphate nor molybdate. The corrosive effect of each of the two solutions upon galvanised iron was tested as follows.

A strip of galvanised iron was first thoroughly cleaned by being successively washed in acetone for 5 minutes, scrubbed in hot distilled water and washed in cold water. It was then dried in a desiccator, weighed and suspended in a beaker so that when the first solution referred to above was poured into the beaker the strip was completely immersed. The strip was left suspended in the solution at room temperature (about 20° C.) for 48 hours, and at the end of that period it was removed from the solution, scrubbed in distilled water, dried in a desiccator and reweighed to determine the loss of weight it had suffered.

As a comparison, the test was repeated using an identical strip of galvanised iron in the second solution.

The results obtained are given below in Table 1 which shows the various weights of phosphate and molybdate used, the corrosion (i.e. the loss of weight in milligrams/sq. cm. of strip surface) suffered by each of the strips exposed to the various first solutions containing inhibitors. The reduction in corrosion obtained by using the corrosion inhibitors is shown in the right-hand column, expressed as a percentage of that suffered by the control strip in the various second solutions.

Table 1
SODIUM DIHYDROGEN PHOSPHATE+SODIUM MOLYBDATE AS INHIBITOR

| Example No. | Weight of NaH₂PO₄ (gram) | Weight of sodium molybdate (gram) | Corrosion (mg./sq. cm.) | Percent Reduction of Corrosion |
|---|---|---|---|---|
| 1 | 0.1 | 0.5 | 0.09 | 99 |
| 2 | 0.1 | 0.1 | 0.13 | 98 |
| 3 | 0.1 | 0.05 | 0.62 | 90 |
| 4 | 0.1 | 0.025 | 1.07 | 83 |
| 5 | 0.1 | 0.01 | 1.33 | 82 |
| 6 | 0.5 | 0.5 | 0.28 | 96 |
| 7 | 0.5 | 0.1 | 0.17 | 97 |
| 8 | 0.05 | 0.02 | 1.07 | 88 |
| 9 | 0.05 | 0.01 | 1.45 | 81 |
| 10 | 0.025 | 0.01 | 0.87 | 89 |
| 11 | 0.01 | 0.02 | 0.88 | 83 |

EXAMPLES 12–19

The test of Examples 1–11 was repeated using various amounts of potassium dihydrogen phosphate ($KH_2PO_4$) instead of sodium dihydrogen phosphate and the results are given in Table 2 below.

Table 2
POTASSIUM DIHYDROGEN PHOSPHATE+SODIUM MOLYBDATE AS INHIBITOR

| Example No. | Weight of KH₂PO₄ (gram) | Weight of sodium molybdate (gram) | Corrosion (mg./sq. cm.) | Percent Reduction of Corrosion |
|---|---|---|---|---|
| 12 | 0.1 | 0.01 | 0.57 | 84 |
| 13 | 0.1 | 0.007 | 0.75 | 88 |
| 14 | 0.1 | 0.005 | 0.66 | 83 |
| 15 | 0.1 | 0.0038 | 0.32 | 92 |
| 16 | 0.1 | 0.0025 | 0.61 | 80 |
| 17 | 0.075 | 0.01 | 0.64 | 82 |
| 18 | 0.05 | 0.02 | 0.88 | 85 |
| 19 | 0.05 | 0.007 | 0.37 | 95 |

EXAMPLES 20–33

Further herbicidal compositions were tested by the method of Examples 1–11 using calcium dihydrogen phosphate ($Ca(H_2PO_4)_2$) instead of sodium dihydrogen phosphate. The results obtained are set out below in Table 3.

Table 3
CALCIUM DIHYDROGEN PHOSPHATE+SODIUM MOLYBDATE AS INHIBITOR

| Example No. | Weight of Ca(H₂PO₄)₂ (gram) | Weight of sodium molybdate (gram) | Corrosion (mg./sq. cm.) | Percent Reduction of Corrosion |
|---|---|---|---|---|
| 20 | 0.05 | 0.02 | 0.17 | 97 |
| 21 | 0.05 | 0.007 | 0.15 | 98 |
| 22 | 0.03 | 0.02 | 0.21 | 96 |
| 23 | 0.03 | 0.01 | 0.19 | 96 |
| 24 | 0.03 | 0.008 | 0.20 | 95 |
| 25 | 0.03 | 0.005 | 0.74 | 82 |
| 26 | 0.03 | 0.003 | 0.80 | 81 |
| 27 | 0.02 | 0.02 | 0.18 | 96 |
| 28 | 0.02 | 0.01 | 0.20 | 96 |
| 29 | 0.02 | 0.008 | 0.20 | 95 |
| 30 | 0.02 | 0.007 | 0.11 | 98 |
| 31 | 0.02 | 0.005 | 0.43 | 90 |
| 32 | 0.01 | 0.01 | 0.11 | 98 |
| 33 | 0.01 | 0.006 | 0.79 | 87 |

EXAMPLE 34

This example illustrates the protection afforded by a mixture of potassium dihydrogen phosphate and sodium molybdate to galvanised iron in contact with the dipyridylium quaternary salt 1,1′-dimethyl-4,4′-dipyridylium di-(methylsulfate).

The test of Examples 1–11 was repeated using an aqueous solution of 1,1′-dimethyl-4,4′-dipyridylium di-(methylsulphate) instead of diquat dibromide monohydrate and using potassium dihydrogen phosphate and sodium molybdate respectively in the amounts of 0.05% and 0.005% by weight of the water of the aqueous solution. The results obtained were as follows:

| Corrosion (mg./sq. cm) | | Percent Reduction of Corrosion |
|---|---|---|
| Control | Inhibited Composition | |
| 2.24 | 0.24 | 89 |

EXAMPLE 35

This example illustrates the marked protection afforded by a mixture of potassium dihydrogen phosphate and sodium molybdate to mild steel immersed in a concentrated (40%) aqueous solution of 1,1′-dimethyl-4,4′-dipyridylium di(methylsulphate).

The test of Example 1 was repeated using a 40% aqueous solution of 1,1′-dimethyl-4,4′-dipyridylium di-(methylsulphate) instead of the 1% solution of diquat dibromide monohydrate, and using the potassium dihydrogen phosphate and sodium molybdate in the respective amounts of 2% and 0.2% by weight of the water of the aqueous solution. It will be seen that even with such a concentrated solution, the percentage reduction in corrosion amounted to as much as 99.2.

| Corrosion (mg./sq. cm) | | Percent Reduction of Corrosion |
|---|---|---|
| Control (no inhibitor) | Inhibited Composition | |
| 23.58 | 0.18 | 99.2 |

EXAMPLE 36

This example illustrates the protection afforded by a mixture of potassium dihydrogen phosphate and sodium molybdate to mild steel immersed in a concentrated aqueous solution of diquat dibromide monohydrate.

The test of Example 1 was repeated using a 40% aqueous solution instead of the 1% solution of diquat dibromide monohydrate, and using potassium dihydrogen phosphate and sodium molybdate in the respective amounts of 4% and 0.4% of the water of the aqueous solution. The results obtained from these tests were as follows:

| Corrosion (mg./sq. cm) | | Percent Reduction of Corrosion |
|---|---|---|
| Control | Inhibited Composition | |
| 1.41 | 0.22 | 84 |

EXAMPLE 37

This example illustrates the protection afforded by a mixture of potassium dihydrogen phosphate and sodium molybdate to aluminium immersed in a 10% aqueous solution of diquat dibromide monohydrate. The amounts of potassium dihydrogen phosphate and sodium molybdate used in the example were respectively 0.75% and 0.1% by weight of the water of the aqueous solution.

It will be seen from the results set out below that the inhibitor mixture had completely prevented corrosion of the aluminium.

| Corrosion (mg./sq. cm) | | Percent Reduction of Corrosion |
|---|---|---|
| Control | Inhibited Composition | |
| 3.40 | Nil | 100 |

What we claim is:

1. A herbicidal composition having a reduced tendency to corrode iron and zinc, comprising a herbicidally effective amount of a normally corrosive, herbicidally active dipyridylium quaternary salt and a corrosion reducing mixture present in corrosion-inhibiting amount, said mixture consisting essentially of an inorganic phosphate which gives rise to $H_2PO_4^-$ ions when dissolved in water and an inorganic water-soluble molybdate, said phosphate and molybdate being selected from the group consisting of the water-soluble ammonium, alkali metal and alkaline earth metal monohydrogen and dihydrogen phosphates and alkali metal molybdates.

2. A composition according to claim 1, in which the dipyridylium salt is one having the formula:

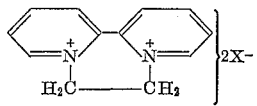

where $X^-$ is an anion.

3. A composition according to claim 2, in which $X^-$ is a bromide ion.

4. A composition according to claim 2, in which $X^-$ is a chloride ion.

5. A composition according to claim 2, in which $X^-$ is selected from the group consisting of an iodide ion and a methosulphate ion.

6. A composition according to claim 1, in which the dipyridylium salt is one having the formula:

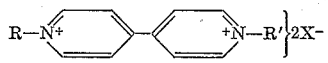

wherein R and R' are selected from the group consisting of an alkyl radical having 1–4 carbon atoms and a carbomethoxy radical and $X^-$ is an anion.

7. A composition according to claim 6 wherein R and R' are both methyl and $X^-$ is a methosulphate ion.

8. A composition according to claim 6 wherein R and R' are both methyl and $X^-$ is a chloride ion.

9. A composition according to claim 6 wherein R and R' are both methyl and $X^-$ is selected from the group consisting of a bromide ion and an iodide ion.

10. A composition according to claim 1, in which the molybdate is sodium molybdate.

11. A composition according to claim 1, in which the phosphate is potassium dihydrogen orthophosphate.

12. A composition according to claim 1, in which the phosphate is a mixture of potassium dihydrogen phosphate and di-potassium hydrogen phosphate.

13. A composition according to claim 1, which is in the form of an aqueous spray composition.

14. A composition according to claim 1, which is a solid composition suitable for dissolution in water.

15. A composition according to claim 1, in which the proportion of phosphate is from 5% to 15% by weight of the dipyridylium quaternary salt.

16. A composition according to claim 15, in which the proportion of molybdate is about 10% by weight of the phosphate.

17. A herbicidal composition of reduced tendency to corrode iron and zinc, said composition comprising a herbicidally effective amount of 1,1'-ethylene-2,2'-dipyridylium dibromide, from 5 to 15% of a water-soluble alkali metal dihydrogen orthophosphate based on the weight of said dipyridylium quaternary salt and about 10% by weight of sodium molybdate based on the weight of phosphate.

18. A herbicidal composition of reduced tendency to corrode iron and zinc, said composition comprising a herbicidally effective amount of 1,1'-ethylene-2,2'-dipyridylium dichloride, from 5 to 15% of a water-soluble alkali metal dihydrogen orthophosphate based on the weight of said dipyridylium quaternary salt and about 10% by weight of sodium molybdate based on the weight of phosphate.

19. A herbicidal composition of reduced tendency to corrode iron and zinc, said composition comprising a herbicidally effective amount of 1,1'-dimethyl-4,4'-dipyridylium di(methylsulphate), from 5 to 15% of a water-soluble alkali metal dihydrogen orthophosphate based on the weight of said dipyridylium quaternary salt and about 10% by weight of sodium molybdate based on the weight of phosphate.

20. A herbicidal composition of reduced tendency to corrode iron and zinc, said composition comprising a herbicidally effective amount of 1,1'-dimethyl-4,4'-dipyridylium dichloride, from 5 to 15% of a water-soluble alkali metal dihydrogen orthophosphate based on the weight of said dipyridylium quaternary salt and about 10% by weight of sodium molybdate based on the weight of phosphate.

21. A herbicidal composition of reduced tendency to corrode iron and zinc, said composition comprising a herbicidally effective amount of 1,1'-di-β-hydroxyethyl-4,4'-dipyridylium dichloride, from 5 to 15% of a water-soluble alkali metal dihydrogen orthophosphate based on the weight of said dipyridylium quaternary salt and about 10% by weight of sodium molybdate based on the weight of phosphate.

References Cited in the file of this patent

UNITED STATES PATENTS

| | | |
|---|---|---|
| 2,728,652 | Hance | Dec. 27, 1955 |
| 2,823,987 | Fielden et al. | Feb. 18, 1958 |
| 2,872,281 | Kahler et al. | Feb. 3, 1959 |
| 2,972,528 | Brian et al. | Feb. 21, 1961 |
| 3,024,201 | Bregman | Mar. 6, 1962 |

OTHER REFERENCES

Robertson: Journal of the Electrochemical Society, vol. 98, No. 3, pages 94 to 100 (1951).